UNITED STATES PATENT OFFICE.

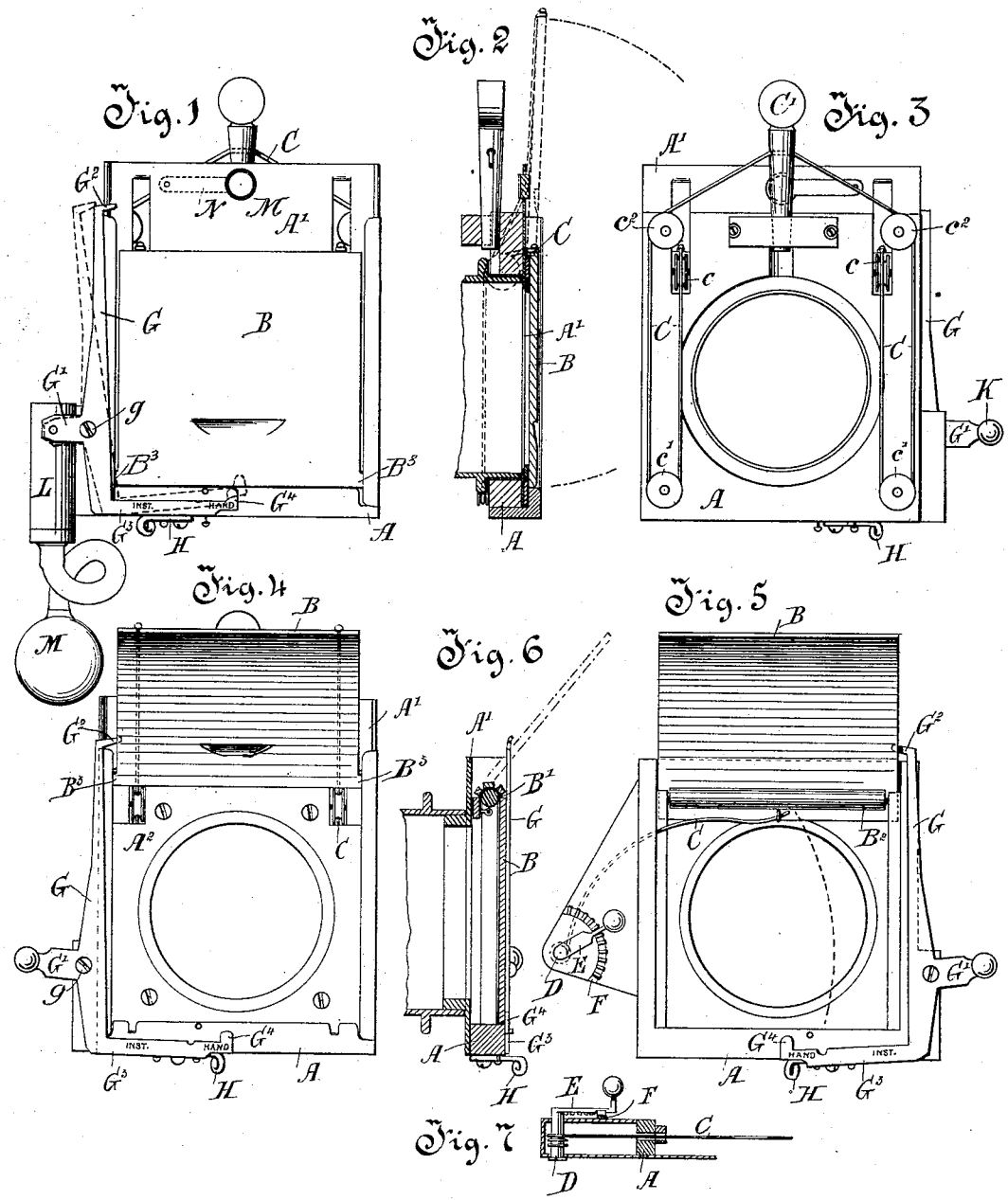

CHARLES DAY DURNFORD, OF EDINBURGH, COUNTY OF MID-LOTHIAN, SCOTLAND.

PHOTOGRAPHIC SHUTTER.

SPECIFICATION forming part of Letters Patent No. 375,671, dated December 27, 1887.

Application filed March 16, 1886. Serial No. 195,466. (No model.) Patented in England September 15, 1885, No. 10,896, and December 22, 1885, No. 15,747.

*To all whom it may concern:*

Be it known that I, CHARLES DAY DURNFORD, residing in the city of Edinburgh, in the county of Mid-Lothian, in that part of Her Majesty's Kingdom of Great Britain and Ireland called Scotland, have invented certain new and useful Improvements in Photographic Shutters; and I do hereby declare that the following is a full, clear, and exact description of the same.

My invention has reference to the shutters used to exclude the light from the lens of a photographic camera, its object being to produce one which shall be simple and inexpensive in construction, and at the same time certain, accurate, and easily controlled in operation.

Up to the present time the shutter for a photographic lens has been composed of two parts—a lid or door which is pivoted at its upper end and a drop or slide resting on same. When this lid or slide is swung upward and outward, the drop or slide falls down. I propose to substitute for this double arrangement a single screen, opening as a flap in exposing, and then reversing and dropping back as a shutter.

It may be thus further described: In the frame surrounding the hood of the lens are formed ways in which the screen is slid up and turned over, being secured in that position by a catch on a lever set so as to control the exposure. Should an instantaneous exposure be required the screen will, on being released from the catch, rise as a flap to the full height, and then turn over and instantaneously resume its original position, closing the aperture. If the exposure is to be longer, the screen on rising as a flap will be held at its highest point by a catch for the desired time, and when released will descend as just described. This raising and reversing movement is accomplished by means of springs, a hand-lever or pneumatic action serving to operate the parts.

For a full comprehension, however, of the invention, reference must be had to the annexed drawings, forming part of this specification, in which—

Figure 1 is a front view of the apparatus; Fig. 2, a vertical sectional elevation of same; Fig. 3, a back view; Fig. 4, a view with the shutter in place for a lengthened exposure. Fig. 5 is a front view, and Fig. 6 a sectional elevation, of a modification of the construction; and Fig. 7, a detail of same.

Similar letters of reference indicate like parts.

A is the frame, made in any approved way and usually surrounding the hood of the lens, A' being a metal front plate, and $A^2$ a faceplate, of vulcanite or other suitable material.

B is the shutter arranged to slide up from its normal position in ways formed in the frame A or plate A', and having a tension-spring, C, attached to it. In the first four figures this tension-spring is of rubber, with ends secured on either side to the top of the shutter and passing over sheaves $c\,c$, $c'\,c'$, and $c^2\,c^2$, and through a tension-regulator, C'. In Figs. 5, 6, and 7 the spring C is of wire wound on a pin, D, and the tension is regulated by an arm, E, of spring metal, held adjustably in the teeth of the arc F.

The shutter B may be, as shown at B', Figs. 5 and 6, made partially flexible, so as to bend over roller $B^2$, or have, as shown in Figs. 1 and 4, ears $B^3\,B^3$, which, working in the groove in A', answer to the other arrangement.

G is a lever, (shown particularly in Figs. 1, 4, and 5,) pivoted at $g$ to the frame, and having projection G', by which it is operated, as will be more fully explained. On the upper end of this lever is a catch, $G^2$, and at its lower end an arm, $G^3$, of varying width, at the end of which is a turned-up catch, $G^4$.

H is a pivoted stop pressing against the under side of $G^3$. This lever may be operated either by a ball or handle, K, on the end of G' or by pneumatic pressure, the handle G' being connected by a pin to a piston working in the tube L and pressed up or drawn down by squeezing or releasing the ball M.

The operation of the invention is as follows: The shutter B is raised by the hand until its lower edge comes to the level of the top of the plate $A^2$, or till the flexible part B' can be bent over the roller $B^2$, and is then turned down, reverse face in front. If it is desired that the exposure shall be instantaneous, the lever G will be turned so that the projection G² shall not be in the line of movement of the shutter B, which is held in the place it has assumed by the catch G⁴, the lever G being then in the position shown in dotted lines in Fig. 1, and the stop H pressing against the widest part of the arm G³. To obtain the instantaneous exposure the catch G⁴ is released by slight pneumatic or other pressure on the arm G′, when the action of the spring C will at once draw the proper upper edge of the shutter outward and upward until it assumes a vertical position, as shown in dotted lines, Fig. 2, with its proper face outward, thus reversing itself and dropping like a shutter down into its normal position. If the exposure is to be by hand, the lever G is (after the shutter has been turned over as just mentioned) placed in such a position that the shutter will, in rising by the action of the spring, be held in the position shown in Fig. 4 and in dotted lines in Fig. 6, until the catch G² is released, when it will slide down, as before described.

To prevent vibration when the shutter strikes the plate A′, a buffer may be introduced to receive the blow, as shown in Figs. 1 and 2, M being a pad passing through the plate and carried on the end of a spring, N.

The frame of these shutters may be placed either within or around the hood of the lens.

What I claim is as follows:

1. A shutter for cameras having a combined sliding and pivotal connection at its upper end with its support, whereby it is adapted to rise and open as a flap and descend and close as a slide, substantially as described.

2. The combination, with a photographic lens, of a frame carrying a single reversible shutter operated by a tension-spring, all substantially as herein set forth.

3. The combination, with the frame and reversible shutter with tension-spring, of the lever G, with catch G², as and for the purposes described.

4. The combination, with the frame A and shutter B, of the lever G, with arm G³ and catch G⁴, and stop H, all as and for the purposes described.

Edinburgh, 9th day of January, A. D. 1886.

CHARLES DAY DURNFORD.

Witnesses:
FRANCIS ROBERT HENDERSON,
C. DAVIES.